(12) United States Patent
Franchet et al.

(10) Patent No.: US 7,507,935 B2
(45) Date of Patent: *Mar. 24, 2009

(54) PROCESS FOR MANUFACTURING A TUBULAR COMPONENT WITH AN INSERT MADE OF A METAL MATRIX COMPOSITE

(75) Inventors: Jean-Michel Franchet, Paris (FR); Gilles Klein, Mery sur Oise (FR); Agathe Venard, Saint Cloud (FR)

(73) Assignee: SNECMA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/420,615

(22) Filed: May 26, 2006

(65) Prior Publication Data

US 2007/0045251 A1 Mar. 1, 2007

(30) Foreign Application Priority Data

May 27, 2005 (FR) .................................. 05 51406

(51) Int. Cl.
*B23K 26/00* (2006.01)
(52) U.S. Cl. .............................. 219/121.64; 219/121.6; 219/87; 219/86.1; 29/419.1
(58) Field of Classification Search ............ 219/121.64, 219/87, 62, 86.1, 86.9, 121.6, 89, 121.63; 29/419.1, 888.046; 428/113; 156/296
See application file for complete search history.

(56) References Cited

U.S. PATENT DOCUMENTS

| | | | | |
|---|---|---|---|---|
| 3,608,183 A | * | 9/1971 | Lemelson | 29/527.7 |
| 3,811,028 A | * | 5/1974 | Henry et al. | 219/78.02 |
| 3,974,016 A | * | 8/1976 | Bondybey et al. | 156/272.8 |
| 4,697,324 A | * | 10/1987 | Grant et al. | 29/419.1 |
| 4,886,108 A | * | 12/1989 | Utsunomiya et al. | 164/461 |
| 5,042,710 A | * | 8/1991 | Siemers et al. | 228/172 |
| 5,045,407 A | * | 9/1991 | Ritter | 428/614 |
| 5,147,086 A | * | 9/1992 | Fujikawa et al. | 228/235.1 |
| 5,222,296 A | | 6/1993 | Doorbar et al. | |
| 5,271,776 A | * | 12/1993 | Siemers et al. | 29/419.1 |

FOREIGN PATENT DOCUMENTS

| | | |
|---|---|---|
| DE | 2 147 735 | 3/1973 |
| DE | 40 21 547 A1 | 1/1992 |
| EP | 1 352 984 A3 | 10/2003 |
| WO | WO 8806564 * | 9/1988 |

OTHER PUBLICATIONS

U.S. Appl. No. 11/420,648, filed May 26, 2006, Franchet, et al.
U.S. Appl. No. 11/420,658, filed May 26, 2006, Franchet, et al.
U.S. Appl. No. 11/420,615, filed May 26, 2006, Franchet, et al.
U.S. Appl. No. 11/441,156, filed May 26, 2006, Franchet, et al.

* cited by examiner

*Primary Examiner*—Jessica L Ward
*Assistant Examiner*—Michael Aboagye
(74) *Attorney, Agent, or Firm*—Oblon, Spivak, McClelland, Maier & Neustadt, P.C.

(57) ABSTRACT

A process for manufacturing a tubular component with an insert made of a metal matrix composite, within which ceramic fibers extend, includes a draping step, in which a bonded sheet of coated filaments is draped around a metal mandrel. Each filament includes a ceramic fiber coated with a metal sheath, and the filaments are bonded by spot welds.

19 Claims, 4 Drawing Sheets

PROCESS FOR MANUFACTURING A TUBULAR COMPONENT WITH AN INSERT MADE OF A METAL MATRIX COMPOSITE

BACKGROUND OF THE INVENTION

1. Field of the Invention

The invention relates to the manufacture of a tubular component that includes an insert made of a metal matrix composite.

2. Discussion of the Background

In the field of aeronautics in particular, one constant objective is to optimize the strength of components for a minimum mass and minimum size. Thus, certain components may from now on include an insert made of a metal matrix composite. Such a composite comprises a metal alloy matrix, for example a titanium (Ti) alloy, in which fibers extend, for example silicon carbide (SiC) ceramic fibers. Such fibers have a tensile strength very much greater than that of titanium (typically 4000 MPa compared with 1000 MPa). It is therefore the fibers that take the loads, the metal alloy matrix providing a function of binder with the rest of the component and also the function of protecting and isolating the fibers, which must not come into contact with one another. Furthermore, the ceramic fibers are resistant to erosion but necessarily have to be reinforced with metal.

These composites may be used in the manufacture of disks, shafts, ram bodies, casings, and spacers, such as reinforcements for monolithic components such as blades, etc.

To obtain such a composite insert, filaments called "coated filaments", comprising a metal-coated ceramic fiber, are formed beforehand. The metal gives the filament the elasticity and the flexibility needed for handling it. Preferably, a very fine carbon or tungsten filament lies at the center of the fiber, along its axis, this carbon filament being coated with silicon carbide, while a thin film of carbon is interposed between the fiber and the metal, in order to provide a diffusion-barrier/buffer function during differential thermal relaxation that occurs as the liquid metal deposited on the fiber cools.

The manufacture of composite filaments, or coated filaments, may be carried out in various ways, for example by vapor deposition of metal in an electric field, by electrophoresis using a metal powder, or else by dip-coating ceramic fibers in a bath of liquid metal. Such a coating process, in which ceramic fibers are dipped into a liquid metal, is presented in patent EP 0 931 846 in the name of the Applicant. The manufacture of the filaments according to this process is rapid. Thus, composite filaments or coated filaments are obtained that serve as the basis for the manufacture of the composite insert which will be included in the component.

In the known processes for obtaining a component with an insert made of a metal alloy matrix composite, the coated filament is then formed from a workpiece called a preform. Such a preform is obtained by winding the coated filament between two metal retaining flanges that extend around a central mandrel. The winding is performed in a spiral, the preform obtained being in the form of a disk, the thickness of which is that of the coated filament constituting it. To ensure cohesion of the preform, the retaining flanges include apertures through which a material providing a bonding function, for example an acrylic resin, is sprayed.

FIG. 1 shows schematically one embodiment of a component with a composite insert. A plurality of preforms 1, each in the form of a disk, are stacked in a container 2 of cylindrical overall shape. The container has an annular cavity 3, the sectional shape of which, transverse to the axis 4 of the container, is that of the preforms 1. Preforms 1 are stacked until the entire height of the cavity 3 is filled. Typically, 80 preforms are thus stacked. This operation is manual.

It is then necessary to perform a binder-removal operation followed by degassing, so as to eliminate the binder, for example an acrylic resin, from the preforms 1. This is because no contaminating element must remain, when cold and hot, in contact with the titanium during the pressing stage.

An annular lid 5, having a projection 6 of shape complementary to that of the annular cavity, but of smaller axial dimension, is placed on top of the container 2, the projection 6 being brought into contact with the upper preform 1. The lid 5 is welded to the container 2, for example by electron beam welding, the assembly preferably being placed in a vacuum. There follows a step in which the assembly undergoes hot isostatic pressing. During this operation, the insert composed of juxtaposed coated filaments is compacted, the metal sheaths of the coated filaments being welded together and welded to the walls of the cavity 3 of the container 2 by diffusion, in order to form a dense assembly composed of the metal alloy (for example a titanium alloy) within which the ceramic fibers (for example SiC fibers) extend annularly.

A cylindrical component is obtained that includes an insert of a composite, resulting from the compaction of the stacked preforms 1. This component may optionally undergo a stress relaxation treatment, making it possible to compensate for the differential expansion between the ceramic fibers and the metal, in which they are embedded, when the assembly cools.

The component is then generally machined so as to obtain the final component.

This process for manufacturing a component with a composite insert has many drawbacks, and is difficult to exploit on an industrial scale owing to the length, complexity and precision required of its steps.

Firstly, since the ceramic fibers are brittle, the operations on the coated filaments must above all prevent any contact between them, and the welding of coated filaments has not been envisaged hitherto.

Furthermore, the binder-removal and degassing operations are not only lengthy, but there is never certainty that all of the binder has been removed. To ensure complete disappearance of the binder, necessary in particular for the correct subsequent behavior of the titanium alloy, several binder-removal and degassing steps are needed. This lengthens the total duration of the process and increases its overall cost.

In addition, should the filament break while it is being wound between the two flanges, it is necessary to form a new preform in so far as at the present time no means exist for solving the problem and resuming the winding.

Moreover, the step of positioning the coated filament preforms in the container is currently manual. The cost of the operation and in particular its precision are affected thereby. Now, the positioning of the coated filament in the container is a critical factor in the manufacturing sequence in so far as it determines the performance of the composite, with a very great influence of the orientation of the ceramic fiber according to the principal stresses of the component. It also determines the quality of the composite, by preserving the integrity of the ceramic fiber, during the various steps in the manufacture of the component. Lastly, it determines the final cost of the component, again because the operations of positioning the coated filaments are relatively lengthy and carried out manually. The positioning of the filaments in the container should therefore benefit from being improved.

The techniques of the prior art relating to the manufacture of components with an insert made of a composite propose the manufacture of annular components, such as rotor disks. It has been envisaged to manufacture tubular components, especially rotor shafts, with an insert made of a composite, but great technical difficulties have prevented the industrial implementation of such manufacture. A process has been envisaged which proposes to slip, into a sheath, mutually parallel coated filaments that extend longitudinally between two mandrels forming the sheath, and then subjecting the whole assembly to hot isostatic pressing. Inserting the coated filaments proves to be very tedious, if not impossible in the case of the latter filaments if it is desired to obtain a high density of coated filaments. Moreover, the risks of improperly positioning the filaments, which would damage them and result in the incorrect behavior of the component, are high. It has also been envisaged to stack preforms of coated filaments over the entire length of the sheath, but the drawbacks of such stacking were mentioned earlier. Moreover, it would be desirable for the ceramic fibers not to extend transversely to the component, for better uptake of the forces.

SUMMARY OF THE INVENTION

The subject of the invention is a process that allows the manufacture of a tubular component, such as a turbomachine rotor shaft, which includes an insert made of a composite, said process being able to be implemented on an industrial scale.

According to the invention, the process for manufacturing a tubular component, comprising an insert made of a metal matrix composite, within which ceramic fibers extend, is characterized in that it includes a draping step in which a bonded sheet of coated filaments is draped around a metal mandrel, each filament comprising a ceramic fiber coated with a metal sheath, and the filaments being bonded by spot welds.

BRIEF DESCRIPTION OF THE DRAWINGS

The invention will be more clearly understood and other features will appear on reading the description that follows with reference to the appended drawings in which.

DETAILED DESCRIPTION OF THE PREFERRED EMBODIMENTS

A method of manufacturing a bonded sheet of coated filaments will firstly be described.

First, a plurality of coated filaments are produced according to one of the known techniques, preferably by a coating process in which ceramic fibers are dipped into a bath of liquid metal. These filaments are each wound onto a bobbin. Each filament has for example a diameter of 0.2 to 0.3 mm.

Figure 1:
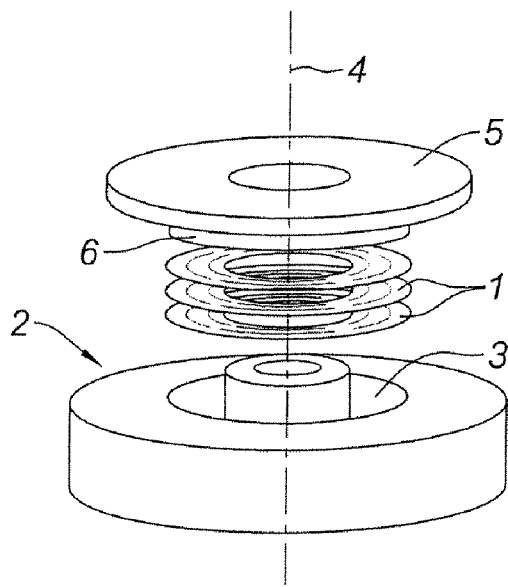
FIG. 1 shows a schematic perspective view of an operation for obtaining a component with a composite insert of the prior art.
Figure 2:
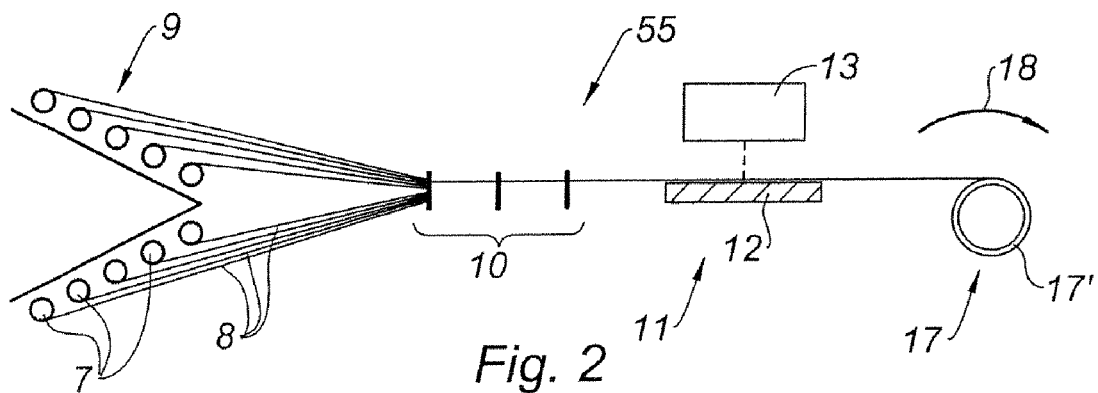
FIG. 2 shows a schematic view of a device for manufacturing a bonded sheet of coated filaments.

Referring to FIG. 2, a plurality of bobbins 7, each with a coated filament 8 wound around its circumference, is placed on a module 9 of bobbins 7. This module 9 makes it possible to place the bobbins 7 in such a way that they can be unwound toward a warping module, presented below, without the filaments 8 crossing one another. In this case, the bobbin module 9 has a structure in the form of an isosceles triangle supporting the bobbins 7, one half of them along one side of the triangle and the other half along the other side, the apex of the triangle being directed on the side to which the filaments 8 are unwound from the bobbins 7, toward a point located on the axis of symmetry of the triangle that forms the structure of the bobbin module 9.

In another embodiment, each bobbin 7 may support a bundle—or array—of coated filaments. Thus, to form a sheet of one hundred coated filaments, ten bobbins 7, each having a bundle of ten coated filaments wound around its circumference, may be used.

The coated filaments 8 are unwound toward a warping module 10. This warping module 10 is shown here in a schematic and undetailed manner as its structure is accessible to a person skilled in the art. It is comparable to a warping module used in the weaving field. The warping module 10 includes guiding means allowing the filaments 8 to be stretched parallel to one another, as a layer in one and the same plane, without mutual overlap in contact with one another. The objective is to form a flat sheet of parallel filaments 8 in contact with one another.

The filaments 8 thus warped are driven into a laser welding module 11. This module includes a flat support 12 over which the filaments 8 move, above which support a laser welding device 13 is mounted. The filaments 8 are therefore driven past the laser welding device 13. The whole assembly is preferably contained in an inert atmosphere, for example an atmosphere of argon injected via a nozzle. The laser welding device 13 may for example comprise a neodymium (Nd)-doped YAG (yttrium aluminum garnet) laser, which has the advantage of high precision with respect to its power and to the point of impact of its laser beam, and also the advantage of having a very fine beam. The laser will here preferably have a power of between 2 and 5 W.

Downstream of the laser welding module 11, the filaments 8 are driven by a module 17 for pulling the filaments 8, from the bobbin module 9, translationally over the support 12. This drive module 17 comprises in this case a rotating bobbin 17' around which the filaments 8 are wound. The bobbin 17' is rotated as shown by the arrow 18. Thus, the filaments 8 are driven from their bobbin 7 of the bobbin module 9 along the warping module 10 and the laser welding module 11 by the drive module 17, the whole assembly forming a device 55 for forming a bonded sheet of coated filaments 8. The bonded sheet is wound up onto the bobbin 17' of the drive module.

Figure 5:
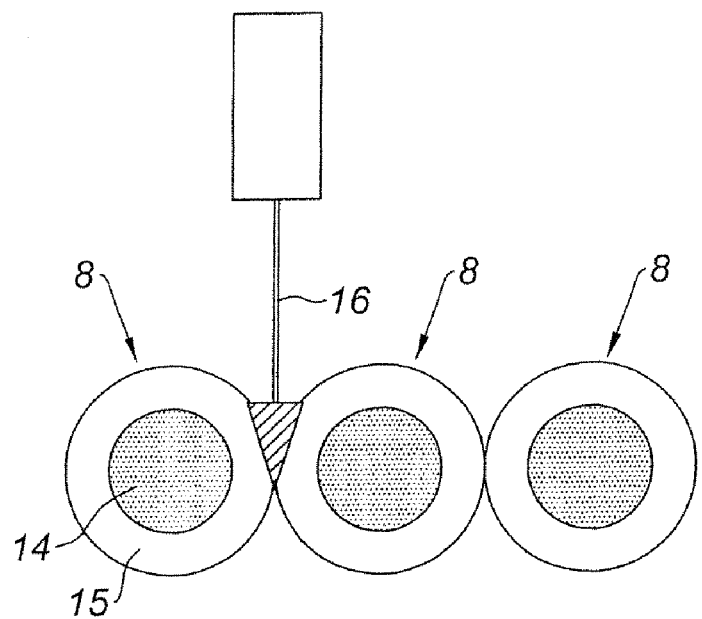
FIG. 5 shows a sectional schematic view, in a plane transverse to the direction in which the coated filaments run, at the laser welding module of the device of FIG. 2, for welding two filaments together.

FIG. 5 shows a sectional representation, in a plane transverse to the direction in which the filaments 8 run, at the laser welding module 11 for welding two filaments 8 together. The welding is carried out by spot welding using the laser welding device 13. Each filament 8 is joined to its neighbors by a plurality of spot welds. Each filament 8 comprises, as was seen previously, a ceramic fiber 14 coated with a metal sheath 15, for example one made of a Ti alloy. The laser beam is directed, as indicated by the arrow 16, in the direction of a contact point between two successive filaments 8, perpendicular to the plane containing all the axes of the filaments 8 driven along the support 12. This results in local melting of their metal sheath 15. The laser is used at low power, but highly concentrated, so as to ensure that the ceramic fiber 14 is not affected by this local melting. A minimum volume of the metal sheath 15 is melted. It is sufficient to ensure that the filaments 8 are joined together at this point. The welding parameters are optimized in such a way that the weld pool resulting from the melting of the metal does not flow out.

It is important for the laser beam to be directed along a point region overlapping two filaments 8, perpendicular to the plane of the filaments 8, so that it does not damage the ceramic fibers 14, the integrity of which is a condition necessary for the operation that is assigned thereto, in the application to the manufacture of a component with a composite insert.

It is unnecessary for the spot welds to be very strong. Their function is solely to ensure overall consolidation, or mutual retention, of the filaments 8 for the purpose of forming a bonded sheet. This consolidation must just be strong enough to allow the sheet to be handled, and possibly wound and unwound, for the purpose for example of constituting a component with a composite insert. The welding is therefore just to keep the filaments 8 together.

Figure 3:
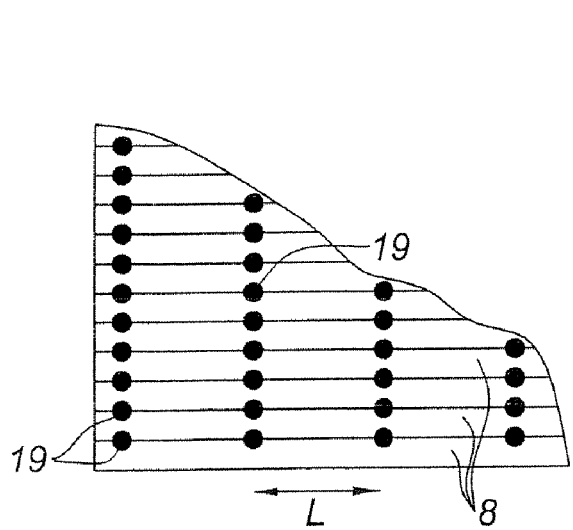
FIG. 3 shows a schematic view from above of a sheet formed according to a first operating mode of the device of FIG. 2.
Figure 4:
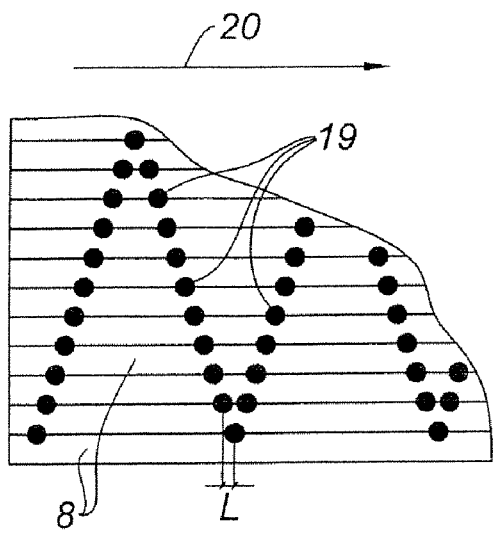
FIG. 4 shows a schematic view from above of a sheet formed according to a second operating mode of the device of FIG. 2.

FIGS. 3 and 4 show schematically two envisaged operating modes for the laser welding module 11, in this case for the formation of a sheet comprising twelve coated filaments 8.

In the operating mode in FIG. 3, when the coated filaments 8 are located beneath the laser welding device 13, the drive module 17 is stopped so as to leave the filaments 8 stationary. The welding device 13 then produces a series of spot welds between the adjacent filaments 8, along a segment perpendicular to the direction in which they run beneath the welding device 13. For this purpose, the welding device 13 makes a first spot weld 19 between two filaments 8, as explained above with reference to FIG. 5. It is then stopped and moved, perpendicular to the run direction of the filaments 8, so as to be in line with the next contact point between two filaments 8, which it welds in a second spot weld 19, and so on, until all the filaments 8 have been joined together along this displacement segment. The welding device 13 therefore makes a segment of spot welds 19, perpendicular to the run direction of the filaments 8 beneath the welding device 13. The drive module 17 is then actuated so as to make the filament 8 run over a length "L" past the welding device 13 and then the operation is repeated on another segment, parallel to the first one.

In the operating mode shown in FIG. 4, the filaments 8 are driven continuously, in the run direction and sense that are shown by the arrow 20, this movement being imposed by the drive module 17. The welding device 13 performs the same operations as previously, namely a welding operation, and then the displacement toward the next point along a path perpendicular to the direction 20 in which the filaments 8 move, etc., from the first filament 8 to the last one, and then in the reverse manner. If the speed of movement of the filaments 8 is low enough, the welding of the spot welds 19 between two moving filaments 8 is possible. A series of spot welds 19 is therefore produced between the filaments 8, which forms a zigzag over the sheet formed by the filaments 8.

It is also possible to obtain such a distribution of the zigzagged spot welds 19 by stopping the drive module 17 when welding each spot weld 19, the drive module 17 driving the filaments 8 over a short distance "l" between each spot weld 19, while the welding device 13 is moved.

It is also possible to operate with only the movement of the filaments 8 being slowed down at the moment of forming the spot welds 19.

The advantage of such a distribution of the spot welds 19 is its greater uniformity over the surface of the sheet formed by the filaments 8.

Whatever the case, on leaving the laser welding module 11, the filaments 8 are in the form of a bonded sheet within which they are joined together at the retaining spot welds 19. The sheet is wound up onto the bobbin 17' of the drive module 17.

Reference has not been made here to the set-up phase of the process for manufacturing a bonded sheet of coated filaments 8. This phase may be freely adapted by those skilled in the art, for example by winding, at the start of the process, the filaments 8 onto the bobbin 17' without them being joined together, the innermost portion of the final wound sheet therefore not being in sheet form, or for example by driving the filaments at the start of the process using another drive device and by connecting them to the bobbin 171 when they start to be in the form of a sheet.

The distance "L" between the segments of spot welds 19 within the context of the segment configuration shown in FIG. 3, or else the longitudinal distance "l" between two successive spot welds 19, in the zigzag configuration shown in FIG. 4, is set according to the desired rigidity of the sheet of coated filaments 8. Thus, for a rigid sheet, the spot welds 19 will be close together, while for a flexible sheet, the spot welds 19 will be further apart. Other configurations of distribution of spot welds 19 are of course conceivable. The configuration and the spacings of the spot welds 19 will be chosen according to the application to which the bonded sheet is intended, especially if it has to be coiled, twisted, etc., while still respecting a minimum space so as to ensure cohesion of the whole assembly under the defined conditions of the application. The specifications relating to the configuration of the distribution of the spot welds 19 are less dependent on the process itself than on the application to which the sheet of coated filaments 8 is intended.

Thanks to the speed of execution of the laser welding and its precision, it is possible to manufacture a bonded sheet of coated filaments 8, the filaments 8 being joined together, in an automated system, on an industrial scale, in order to implement the process that has just been described. Large quantities of sheets of coated filaments 8 are thus rapidly obtained —it is possible to form several kilometers of the same sheet— in a form that can be exploited in various ways. Moreover, the sheets are bonded together by melting of the metal sheath 15 of the filaments 8, and therefore without addition of material, especially without the addition of a binder such as an adhesive, thereby making it possible to eliminate, in a more general process for forming a component with a composite insert using coated filaments, all the binder-removal steps.

A process for manufacturing, according to the present invention, a tubular component with an insert made of a metal matrix composite will now be described.

Figure 6:
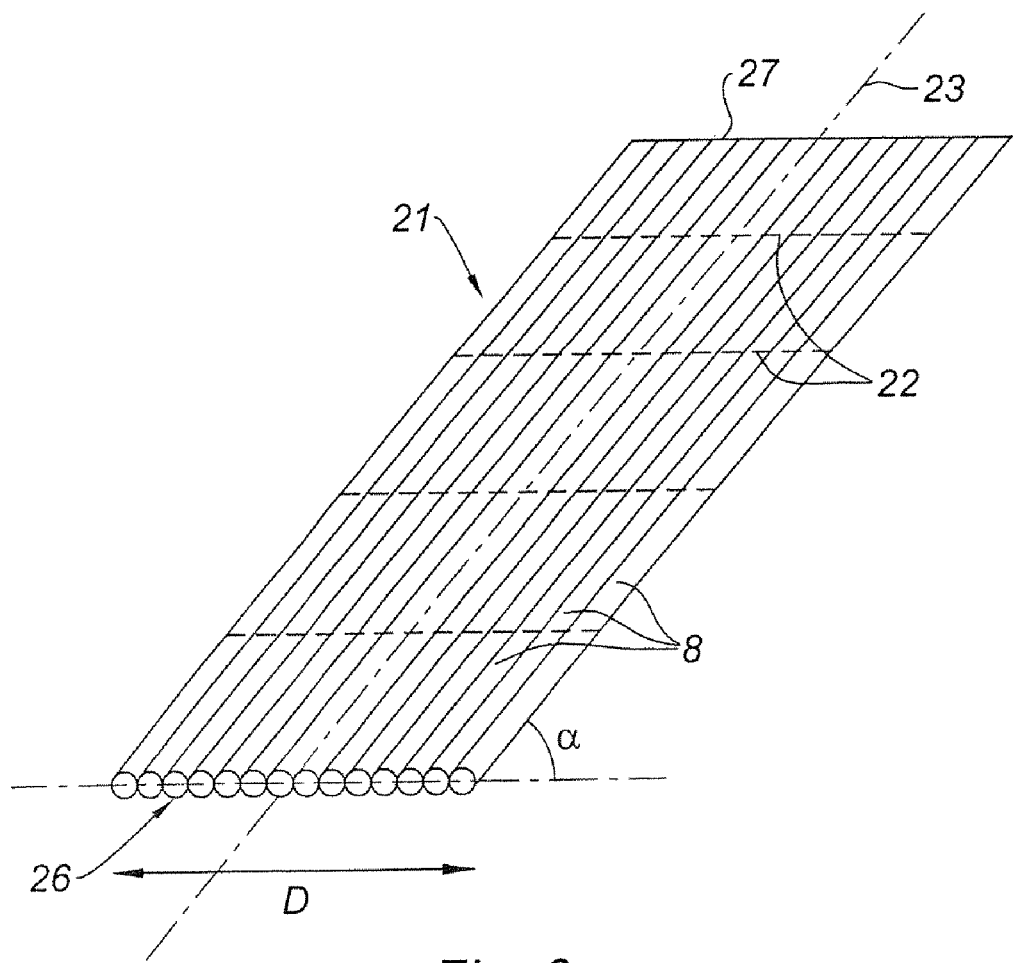
FIG. 6 shows a schematic perspective view of a sheet of coated filaments with beveled ends, for implementing the process for manufacturing a tubular component with an insert made of a composite.

Referring to FIG. 6, a sheet 21 of coated filaments 8 has therefore been formed, said sheet comprising here fourteen mutually parallel filaments fastened together by a method of forming a sheet as shown in FIG. 3. Thus, the filaments 8 are joined together by spot welds extending along segments 22 that are parallel to each other and perpendicular to the overall axis 23 of the sheet 21 (i.e. perpendicular to the axes of the filaments 8 when the latter extend in a linear fashion). The ends of the sheet 21 are beveled so as to obtain end segments 26, 27 of the sheet 21 of width "D", making an angle "α" with the axis 23 of the sheet 21.

Figure 7:
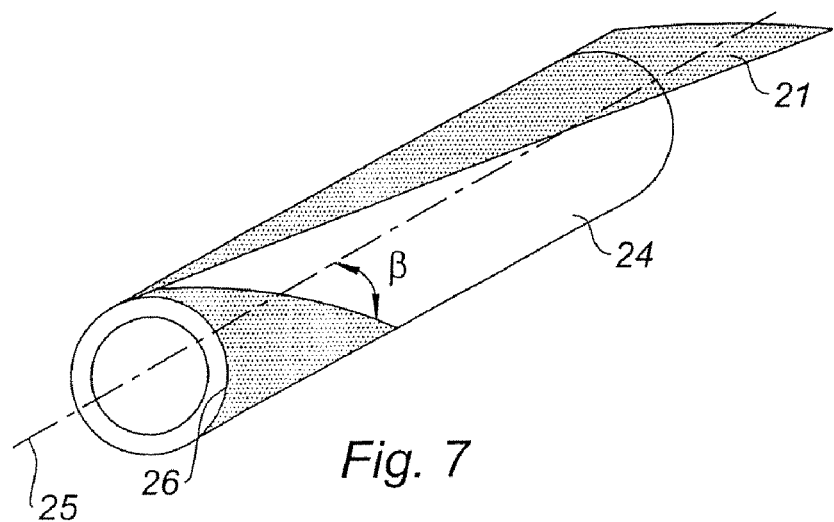
FIG. 7 shows a schematic perspective view of the laying-up of the sheet of FIG. 6 around a mandrel.

Referring to FIG. 7, the sheet 21 thus beveled is draped, or laid up, around a cylindrical mandrel 24. This mandrel 24 is a hollow metal tube, preferably made of the same metal as that with which the ceramic fibers of the coated filaments 8 are coated, here a titanium alloy. It has a circular external perimeter, the value of which is equal to the value of the width "D" of the beveled ends of the sheet 21. The sheet 21, prior to draping, is wound, via one of its end segments 26, around one end of the mandrel 24, and then draped helically around the mandrel 24, helical draping being possible because of the angle α between the axis 23 of the sheet 21 and the segments 26, 27 forming the beveled ends of the sheet 21, especially the segment 26, which is wound beforehand around one end of the mandrel 24. The longitudinal edges of the sheet 21 make an angle β (where $\beta=\pi/2-\alpha$) to the axis 25 of the mandrel 24. The sheet 21 is draped all around the mandrel 24, completely covering its external surface, without the coated filaments 8 of the sheet 21 overlapping one another. The longitudinal edges of the sheet 21 are brought into contact with one another in succession at each turn of the draping. Finally, the sheet 21 has been designed and its end segments 26, 27 beveled in such a way that its dimensions correspond to the developed area of the mandrel 24.

Depending on the thickness of the insert made of a metal matrix composite that is desired in the final component, it is possible to drape a plurality of sheets 21 around the mandrel 21, one after another. Preferably, when one sheet is draped around the previous sheet 21, its initial position at the end of the mandrel 24 is such that, once the new sheet has been draped, each of its coated filaments 8 extend between two coated filaments 8 of the previous sheet, in a staggered fashion, thereby ensuring better compactness of the assembly. Moreover, it is possible to offset the sheets 21 angularly so that, in addition, the curves along which their longitudinal edges join are offset from one another, preferably as far apart as possible (each curve defining the contact between two longitudinal edges may for example lie equidistantly from the two proximal curves of the preceding sheet). It goes without saying that the dimensions of each new sheet 21 must be adjusted according to the number of sheets 21 that have already been draped. The number of filaments making up each additional sheet can be readily calculated, knowing the dimensions of the individual filaments, the perimeter of the mandrel and the number of layers already draped. Preferably, the end of the mandrel 24, where the sheets 21 were initially positioned and wound, has a rim forming an axial stop, of radial dimension, either equal to the thickness of the total number of sheets 21, or greater than this. The same may apply to the other end.

The angle α is determined by a person skilled in the art according to the stresses and various stressing (centrifugal, tensile, torsional, compressive, etc.) modes to which the final component will be subjected. It is mainly the ceramic fibers that will take up the forces, their orientation and their distribution having a key influence on the behavior of the component. It is thus possible to adapt the angle α, the diameter of the coated filaments 8, the diameter of the ceramic fibers, etc. according to the application in question. In the particular case considered here, α is set at 45°.

Optionally, if a number of sheets 21 are draped around the mandrel 24, different angles α may be provided for these sheets 21. However, in this case, it is recommended to use coated filaments 8 whose metal sheath is thicker, so as to properly protect the ceramic fibers lying within them.

In order to drape the sheets 21, the latter are fastened either to the mandrel 24, if this is the first sheet 21, or to the preceding sheet, if this is a final sheet 21, at the start of draping when the end 26 of the sheet 21 is wound around the end of the mandrel 24 or of the preceding sheet. The draping is continued and the other end of the sheet 21 is fastened to the whole assembly in a similar manner. Preferably, a contact welding method is used, by contact between two electrodes and passage of a medium-frequency current, as will be presented later, to weld a thin band of the end portions of the sheet 21. Any other method may be employed.

According to another method of implementation a sheet 21 may be welded to the mandrel 24 or to the preceding sheet along a longitudinal line relative to the mandrel 24, preferably using a contact welding method, by contact between two electrodes and passage of a medium-frequency current, as described later.

Once the desired number of sheets 21, have been draped around the mandrel 24, the whole assembly is inserted into a sheath, having an internal diameter equal to the external diameter of this assembly. Preferably, this sheath is made of the same metal alloy as that with which the fibers of the coated filaments 8 are coated, here a titanium alloy. The sheath is complementary with the rims forming the axial stops of the mandrel 24 in such a way that the assembly, which is preferably plugged at each of its ends by circular metal plates, is homogeneous and in the form of a cylinder. The circular plates and the sheath are preferably welded by electron beam welding so as to constitute a sealed container. These plates are preferably made of a titanium alloy. The electron beam welding allows a vacuum to be created beforehand inside the sheath. The assembly formed is then compacted by hot isostatic pressing.

During the hot isostatic pressing, which is carried out for example at a pressure of 1000 bar at 950° C., the titanium alloy is made to diffuse and to create the metal matrix of the composite, within which the ceramic fibers extend. Since the titanium alloy is viscous at high temperature, it permits good diffusional flow of the material, without damaging the ceramic fibers, during formation of the metal matrix. Thus, in the particular case in question, a shaft is obtained that has an internal titanium alloy thickness corresponding to the mandrel 24, a central insert made of a composite having a titanium alloy matrix, in which the ceramic fibers extend in a helical manner, and an external titanium alloy thickness corresponding to the sheath.

This shaft may be machined according to the final component desired. Preferably, the ends of the shaft, with the metal plates and one or both of the optional axial stop rims for the sheets are removed so as to obtain a shaft that is uniform over its entire length. Such a shaft has the advantage of very good resistance to the forces owing to the composite insert, which allows the total thickness of its wall to be substantially smaller than that of conventional shafts. This small thickness implies, apart from a considerable weight saving, a smaller size, which is useful in applications requiring the presence of many coaxial shafts. The shaft also exhibits very good corrosion resistance since its base constituent here is a titanium alloy, the corrosion behavior of which is for example better than that of steel. Without the presence of the ceramic fibers, the titanium alloy would however have insufficient resistance to the forces.

The process described may be implemented on an industrial scale, owing to its simplicity and reliability of execution, the more so if the methods of forming the sheets by laser spot welding and electrode contact welding, described below, are used. The sheets formed by laser welding have, as we have already seen, the advantage of being strong, and moreover of variable strength, easily handleable and free of any addition material, for example adhesive. This dispenses with the winder-removal and degassing operations and makes it possible for sheets containing only the Ti alloy and ceramic fibers to be draped directly.

In the process described above for manufacturing a tubular component with a composite insert, it is advantageous, at least at the start and end of the process, to fasten the sheet either to the metal support onto which it is wound or to the sheet of the bottom layer.

Hitherto, processes for fastening coated filaments have proposed spraying an adhesive onto the filaments, the drawbacks of which were mentioned above. Processes comprising a step of welding the sheets are, moreover, generally avoided as they come up against many implementation difficulties, the most important one being the need to prevent the ceramic fibers lying within the coated filaments from suffering any damage. These fibers may have a diameter of 100 to 200 μm, or greater, and are particularly brittle in bending and in shear. Any damage to the ceramic fiber of a coated filament nullifies the inherent advantages of this filament.

Described below are a process and a device for the localized welding of a coated filament or of a bonded sheet or bundle of coated filaments to a metal support, it being understood that the support is either a metal support in the proper sense or another coated filament or another sheet or bundle of coated filaments. This process and this device allow the filament or the sheet or the bundle to be fastened to the support, while preserving the integrity of the ceramic fibers lying within the filament(s). The process and the device also allow the filaments to be repaired in the event of a breakage during a winding or lay-up process.

Figure 8:
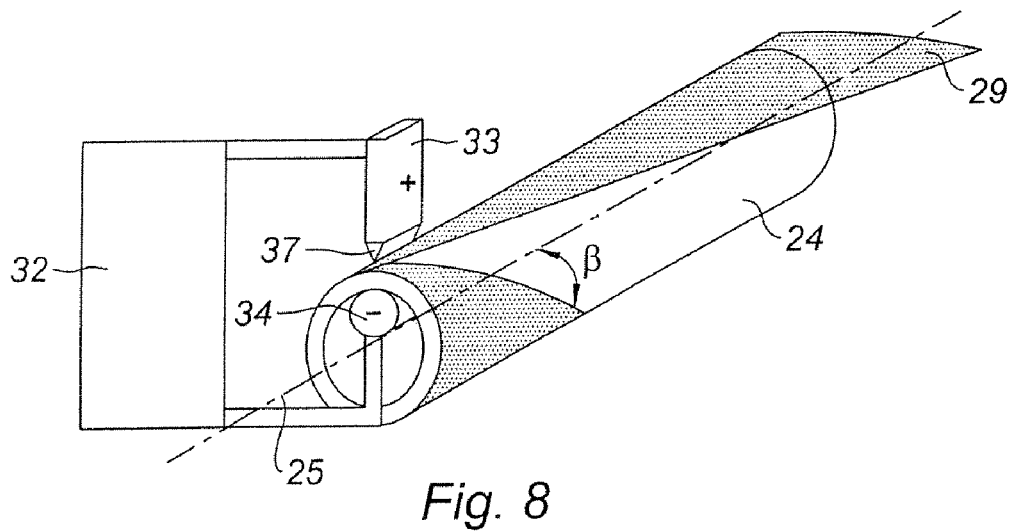
FIG. 8 shows a schematic perspective view of a first embodiment of an electrode welding device for welding a sheet of coated filaments to a metal support, at the start of the winding of the sheet onto a mandrel.

Referring to FIG. 8, a sheet 29 of coated filaments 8, for example formed by the abovementioned process for forming a sheet, is intended to be bonded to the mandrel 24. For this purpose, it is desirable to fasten the sheet 29 to the mandrel 24 at the start of winding. To do this, a contact welding device 31 for welding between two electrodes and for passing a medium-frequency current is used. The coated filaments 8 extend along the external periphery of the mandrel 24. The sheet 29 here comprises ten filaments.

The electrode welding device 31 includes a medium-frequency generator 32 connected to a positive electrode 33 and to a negative electrode 34. In the embodiment shown in FIG. 8, the positive electrode 33 and the negative electrode 34 extend along the axis of the mandrel 24. Their shape in cross section is uniform over its entire width.

The positive electrode 33, which for example is made of copper or tungsten, has a beveled end portion 37. This end portion 37 is shaped so that the lines of current are maximally convergent so as to pass along a line, or band, of contact as narrow as possible between the positive electrode 33 and the sheet 29 of coated filaments 8. This end portion 37 is rounded so as not to shear the filaments 8, which would risk damaging them. The radius of this end portion 37 is chosen so as to obtain the best possible convergence of the lines of current, without however being too small, so as not to shear the filaments 8.

The negative electrode 34 is also shaped so as to minimize its area of contact with the mandrel 24 to which the sheet 29 has to be welded, so as to make the lines of current 38 converge along a line or band as narrow as possible. The geometry of the mandrel 24, which is tubular here, means that a cylindrical negative electrode 34 can be used, thus reducing the contact area to a generatrix favorable to convergence of the lines of current.

Such an arrangement of the electrodes 33, 34 ensures that the sheet 29 is subsequently welded to the mandrel 24 along a very narrow band. The current concentration is constant in this band.

The electrode welding process includes the particular feature of combining the heating of the metal of the sheet 29 with slight forging, obtained by the electrodes 33, 34 pressing on the sheet 29. The power and the duration of the heating and pressing are advantageously controlled, so as to obtain minimal heating of the metal and forging thereof, and thus to effect solid-state welding.

The sheet 29 is heated by flow of the current through the sheet 29 and the mandrel 24, between the positive electrode 33 and the negative electrode 34, the current generated by the medium-frequency generator 32 being controlled. Pressure is applied here to the sheet 29 by the positive electrode 33 pressing on it, the positive electrode thus having a second function, namely that of a press. The rounded shape of its end portion 37 assumes all its importance for this function, since the filaments 8 of the sheet 29 must not be sheared.

Figure 9:
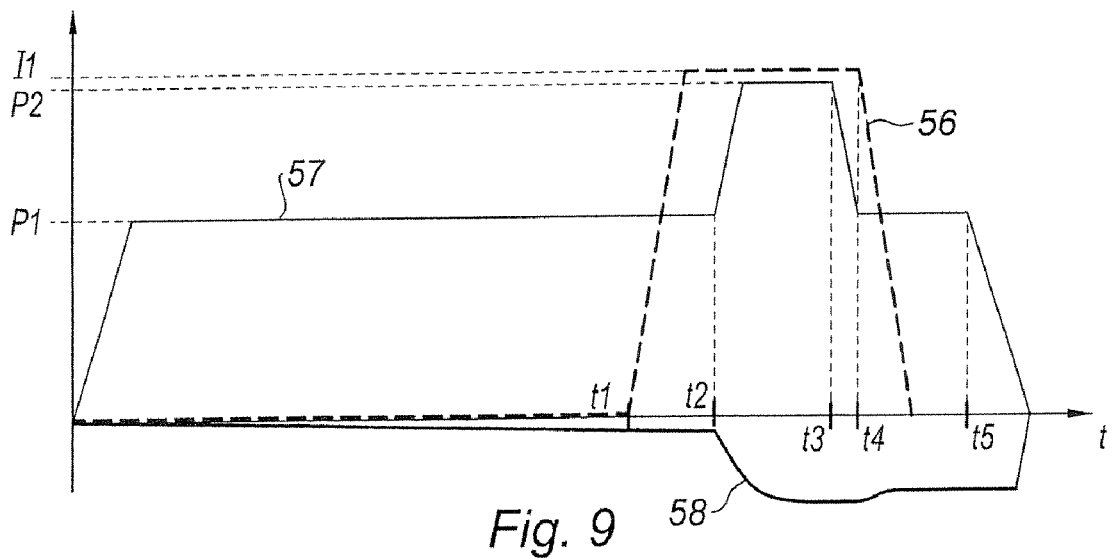
FIG. 9 is a plot showing schematically the variation in the intensity of the current flowing between the electrodes, the variation in the pressure exerted by the electrodes and the variation in the compaction of the sheet, as a function of time, in an electrode welding process for welding a sheet of coated filaments to a support described in the present application.

FIG. 9 is a plot showing, as the dashed-line curve 56, the variation in the intensity of the current passing between the electrodes 33, 34, and, as the solid-line curve 57 above the x-axis, the variation in the pressure exerted by the positive electrode 33 as a function of time t. Also shown is a solid-line curve 58 below the x-axis, which represents the compression of the sheet 29.

The execution of the electrode welding process is described here below. As has been mentioned, this is a solid-state welding process. The positive electrode 33 and the negative electrode 34 are brought into contact with the sheet 29 of coated filaments 8 and the inner surface of the mandrel 24, respectively. In a first phase, only pressure is applied to the coated filaments 8, between the two electrodes 33, 34. The pressure is brought to a value P1, which is maintained until a time t1. P1 will preferably be between 50 and 100 W. The function of this "cold" pressing phase is to ensure that there is good contacting of the coated filaments 8 both between themselves and to the walls of the mandrel 24. In the case examined later, in which at least two layers of coated filaments 8 are welded together, the purpose during this phase is, similarly, to ensure mutual contacting of all the filaments in question (one layer of filaments fulfilling the role of support for the others). This good contacting ensures proper flow of the current during the next phase.

In a second phase, at time t1, while the pressure remains constant at P1, the current is raised to a value I1. Preferably, I1 will be between 500 and 1500 A. This heats up the metal coating the ceramic fibers of the coated filaments 8 and starts the welding process.

In a third phase, at time t2, the pressure is taken to a value P2, greater than P1, so as to implement additional forging of the coated wires 8 of the sheet 29. It may be noted from curve 58 that the compression of the sheet 29, which is slight and uniform up to time t2, is increased owing to the additional forging, that is to say the combined action of the flow of current (and therefore the heating) and the higher pressure. The welding then takes place.

In a fourth phase, after time t3, the pressure is brought back down to its value P1.

In a fifth phase, from the time t4 when the pressure has resumed its value P1, the current is reset to zero, while the pressure is maintained at its value P1, so as to hold the weld in place as it cools, until time t5, the start of the final phase of reducing the pressure exerted by the electrodes 33, 34 to zero and of completing the process.

It may be noted from the curve 58, that during the fourth, fifth and final phases, the compression of the sheet 29 may be reduced slightly (that is to say the thickness of the sheet again increases slightly) by an elasticity effect. The compression is generally over the range from 0.05 to 0.15 mm.

Thus, owing to this contact welding process between two electrodes, the metal sheaths of the coated filaments 8 are locally heated and welded, and form bonds between them and with their support, in the case that has just been presented with the external surface of the mandrel 24, along a narrow band in the contact region between the end portion 37 of the positive electrode 33 and the sheet 29. This welding takes place without impairing the ceramic fibers. More precisely, passing the medium-frequency current leads to a local temperature such that the constituent material of the sheath of the coated filaments 8 remains in the solid state but reaches the temperature range for welding (and forging) the material, the melting point of the material not being reached. The force applied by the electrode, typically of the order of 10 DaN, allows the welding to be activated. Thus, along this band, a monolithic thickness of metal within which the ceramic fibers lie is obtained, said fibers not being impaired by the welding operation.

The sheet 29 is thus fastened to the mandrel 24, allowing the lay-up process to be started. This fastening is not necessarily very strong—it is a welding retaining band sufficient for the application for which it is intended, here the laying-up of a sheet 29 of coated filaments 8 onto a mandrel 24.

Figure 10:
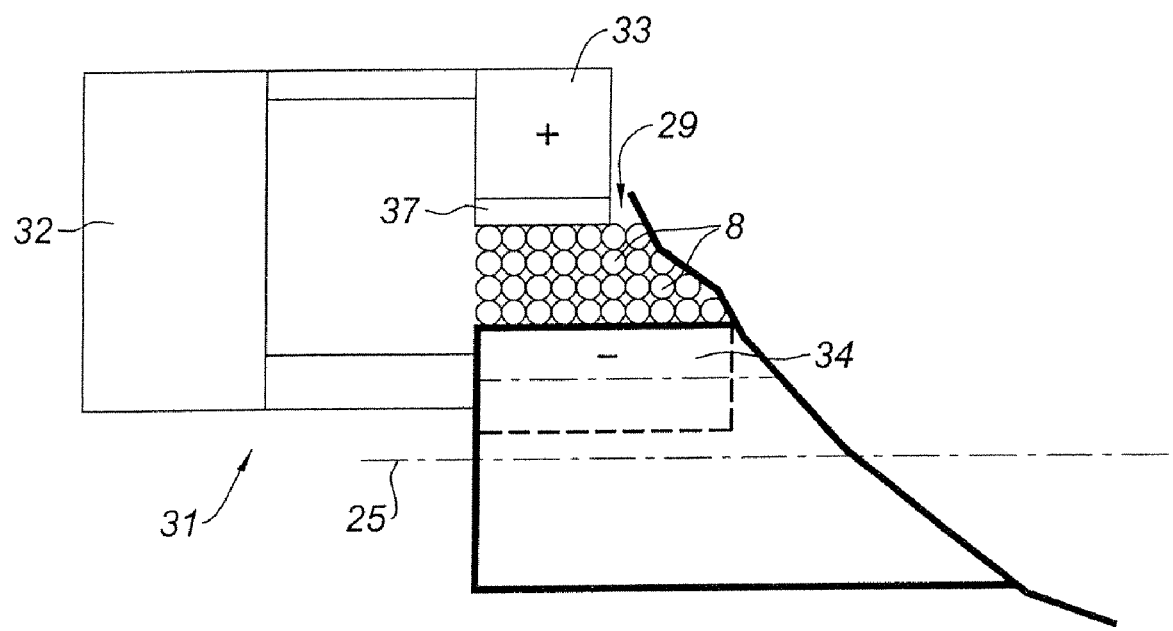
FIG. 10 shows schematically the device of FIG. 8, in cross section, at the end of winding the sheet onto a mandrel.

Referring to FIG. 10, the same operation is carried out at the end of lay-up, so as to weld the end of the sheet 29 to the bottom layer of the sheet 29, located just beneath it. The contact welding process employed is similar. The current generated by the medium-frequency generator 32 and the pressure exerted by the positive electrode 33 are optimized so that preferably only the two outermost layers of the sheet 29 are welded together, forming as it were, along the welded band, a monolithic layer within which the two series of ceramic fibers lie, over a narrow width. It is not excluded to weld several layers of the sheet 29 together. This does not necessarily entail drawbacks. This is because, if the lay-up is intended to form an insert in a component, the whole assembly will in any case be compacted subsequently. Nevertheless, the energy levels are controlled, so as to control the welded sheet depth. The current passes from the positive electrode 33 to the negative electrode 34 through all the layers of the sheet 29 and the mandrel 24. The "cold" pressing phase ensures contact between the layers for proper flow of the current.

It is also possible to form a weld band transverse to the axis of the mandrel 24 by applying the device transversely. The beveled end 37 of the positive electrode 33 may then be concave in shape, the mandrel 24 being turned so that a weld band is formed around the entire periphery of its end.

The contact welding process for welding one or more coated filaments also makes it conceivable to repair a filament or a sheet or bundle of filaments should it break while it is being wound or draped. In the prior art, when a filament was being wound, its breakage meant that the winding process had to be stopped, and a new winding process started, the filament that had been wound and had broken being lost. The contact welding process allows the broken ends of a filament or sheet to be welded together and the winding or draped to be resumed.

The invention claimed is:

1. A process for manufacturing a tubular component comprising an insert made of a metal matrix composite, within which ceramic fibers extend, said process comprising:
   placing filaments next to each other, wherein each filament comprises a ceramic fiber coated with a metal sheath, such that the metal sheath of each filament contacts the metal sheath of an adjacent filament;
   welding said filaments together by laser spot welding by directing a laser beam toward contact points between two adjacent filaments so that said laser beam is perpendicular to said adjacent filaments at said contact points, wherein said laser spot welding is performed by sequentially exposing contact points of different pairs of adjacent filaments to said laser beam thereby forming an interrupted weld across a transverse direction of a bonded sheet; and
   draping said bonded sheet of coated filaments around a metal mandrel.

2. A process for manufacturing a tubular component according to claim 1, wherein said draping of said bonded sheet is performed by wounding a beveled end of the bonded sheet around one end of the mandrel and then draping the bonded sheet in a helical manner around the circumference of the mandrel.

3. A process for manufacturing a tubular component according to claim 1, further comprising at least one additional step of laying up another bonded sheet of coated filaments around an already draped bonded sheet.

4. A process for manufacturing a tubular component according to claim 1, further comprising;
   inserting the mandrel and the bonded sheet into a metal sheath; and
   compacting said metal sheath with said mandrel and bonded sheet inserted therein by hot isostatic pressing.

5. A process for manufacturing a tubular component according to claim 4, further comprising, before the hot isostatic pressing, a step of welding each end of the mandrel to a circular metal plate.

6. A process for manufacturing a tubular component according to claim 1, wherein said placing of the filaments includes warping and driving the filaments side by side, by a drive module, past a laser welding device, which forms spot welds between the adjacent filaments.

7. A process for manufacturing a tubular component according to claim 1, further comprising fastening the bonded sheet to the mandrel with a contact welding process between two electrodes and passage of a medium-frequency current, wherein an electrode is applied to the bonded sheet and an electrode is applied to its support, and current passes in order to induce welding by solid-state diffusion.

8. A process for manufacturing a tubular component according to claim 7, further comprising fastening the bonded sheet at its ends both at the start and at the finish of the draping step.

9. A process for manufacturing a tubular component according to claim 7, wherein the bonded sheet is fastened along a longitudinal band.

10. A process for manufacturing a tubular component according to claim 1, wherein said placing of said filaments next to each other is performed such that the filaments are placed in one and a same plane.

11. A process for manufacturing a tubular component according to claim 10, wherein said welding of said filaments is performed by directing said laser beam perpendicularly to said plane in which said filaments are placed.

12. A process according to claim 11, further comprising adjusting the rigidity of said bonded sheet by adjusting a distance between successive weld spots.

13. A process according to claim 11, wherein said process is free of any step of adding a binder throughout said manufacturing of said tubular component.

14. A process according to claim 11, wherein said process is free of any step of removing a binder throughout said manufacturing of said tubular component.

15. A process for manufacturing a tubular component according to claim 1, further comprising a step of adjusting welding parameters of said laser spot welding such that weld pools at said contacts point do not flow out.

16. A process for manufacturing a tubular component according to claim 1, wherein said laser spot welding is performed in an inert atmosphere.

17. A process for manufacturing a tubular component according to claim 16, wherein said laser spot welding is performed in an argon atmosphere.

18. A process according to claim 1, further comprising a step of winding the welded filaments before said step of draping, and wherein said process is free of a step of pressing said filaments with rollers between said welding step and said winding step.

19. A process according to claim 1, wherein said laser spot welding is concentrated at said contact points such that said laser beam is not directed toward said ceramic fibers and such that said ceramic fibers are not affected by a local melting of the metal sheath caused by said laser beam at said contact points.

* * * * *